United States Patent [19]
Grieve et al.
[11] Patent Number: 4,883,747
[45] Date of Patent: Nov. 28, 1989

[54] COLOR PHOTOTHERMOGRAPHIC ELEMENTS

[75] Inventors: Duncan M. A. Grieve, Walden; Stephen S. C. Poon, Harlow; Tran V. Thien, Harlow, all of Great Britain; Kumars Sakizadeh, Woodbury; David C. Weigel, White Bear Lake, both of Minn.

[73] Assignee: Minnesota Mining and Manufacturing Company, St. Paul, Minn.

[21] Appl. No.: 200,665

[22] Filed: May 31, 1988

[30] Foreign Application Priority Data

Jun. 3, 1987 [GB] United Kingdom ................ 8712961

[51] Int. Cl.[4] ................ G03C 1/14
[52] U.S. Cl. ................ 430/542; 430/351; 430/559; 430/619
[58] Field of Search ................ 430/351, 542, 619, 559

[56] References Cited

U.S. PATENT DOCUMENTS

| | | | |
|---|---|---|---|
| 4,460,681 | 7/1984 | Frenchik | 430/502 |
| 4,585,734 | 4/1986 | Weigel | 430/619 |
| 4,587,211 | 5/1986 | Ishida et al. | 430/619 |
| 4,708,928 | 11/1987 | Geisler | 430/619 |

*Primary Examiner*—Paul R. Michl
*Assistant Examiner*—Janet C. Baxter
*Attorney, Agent, or Firm*—Donald M. Sell; Walter N. Kirn; Mark A. Litman

[57] ABSTRACT

A photothermographic element comprising a support bearing a photothermographic medium, the medium comprising a light sensitive silver halide in reactive association with a silver salt of an organic acid and a color generating reducing agent which is a leuco compound which is oxidisable by silver ions into a colored dye of the general formula:

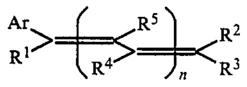

in which:

n=0, 1 or 2, $R^1$ represents H, CN, lower alkyl of 1 to 5 carbon atoms, aryl or $COOR^6$ in which $R^6$ is lower alkyl of 1 to 5 carbon atoms or aryl, $R^2$ and $R^3$ independently represent CN, $NO_2$, $COOR^6$, $SO_2R^6$, $CONHR^6$ in which $R^6$ is as defined above or $R^2$ and $R^3$ together represent the necessary atoms to form a 5- or 6-membered carbocyclic or heterocyclic ring having ring atoms selected from C, N, O and S atoms, which carbocyclic or heterocyclic rings possess at least one conjugated electron withdrawing substituent, $R^4$ and $R^5$ independently represent H, CN or lower alkyl of 1 to 5 carbon atoms or together represent the necessary atoms to complete a 5- or 6-membered carbocyclic ring, and Ar represents:

(a) a thienyl group which may be substituted with one or more lower alkyl groups of 1 to 5 carbon atoms, (b) a furyl group which may be substituted with one or more lower alkyl groups of 1 to 5 carbon atoms or (c) a phenyl group which may be substituted with one or more groups selected from halogen, hydroxy, lower alkyl of 1 to 5 carbon atoms, lower alkoxy of 1 to 5 carbon atoms, $NR^7R^8$ in which $R^7$ and $R^8$ are independently selected from H, lower alkyl group of 1 to 5 carbon atoms which may possess substituents selected form CN, OH, halogen and phenyl, and phenyl group optionally substituted with substituents selected from OH, halogen, lower alkyl of 1 to 5 carbon atoms or lower alkoxy of 1 to 5 carbon atoms or $R^7$ and $R^8$ together represent the necessary atoms to complete a morpholino group, or said phenyl group may be part of a larger ring structure comprising two or more rings which may be aromatic or heterocyclic containing up to 20 ring atoms selected from C, N, O and S.

13 Claims, No Drawings

COLOR PHOTOTHERMOGRAPHIC ELEMENTS

FIELD OF THE INVENTION

This invention relates to photothermographic materials and in particular to dry silver systems capable of producing colour images.

BACKGROUND TO THE INVENTION

Dry silver photosensitive compositions comprise an intimate mixture of a light sensitive silver halide and another silver compound such as a silver salt of an organic acid, e.g. silver behenate or silver saccharine, which upon reduction gives a visible change and which is substantially light insensitive. Such a mixture is usually prepared in suspension and the resulting dispersion spread as a layer on a suitable substrate. When dry, the layer is exposed to a light image and thereafter a reproduction of the image can be developed by heating the layer in the presence of a reducing agent already contained in the coating.

It is because the exposure and development of the layer occur without using water, that these materials are often referred to as dry silver, light sensitive materials. Such materials are well known in the art. Minor amounts of a photosensitive silver halide, which acts as a catalyst (silver) progenitor are associated in catalytic proximity with major amounts of a heat sensitive oxidation-reduction image forming reaction mixture. The mixture reacts more rapidly in the presence of the catalyst (silver) resulting upon exposure (photoreduction) of the silver halide. Examples of such materials are described in British Patent Specification No. 1 110 046 and U.S. Pat. Spec. Nos. 3,839,049 and 3,457,075.

A wide range of reducing agents have been disclosed in dry silver systems including amidoximes such as phenylamidoxime, 2-thienylamidoxime and p-phenoxyphenylamidoxime, azines, e.g. 4-hydroxy-3,5-dimethoxybenzaldehyde azine; a combination of aliphatic carboxylic acid aryl hydrazides and ascorbic acid, such as 2,2-bis(hydroxymethyl)propionyl-beta-phenyl hydrazide in combination with ascorbic acid; a combination of polyhydroxybenzene and hydroxylamine, a reductone and/or a hydrazine, e.g. a combination of hydroquinone and bisethoxyethylhydroxylamine, piperidinohexose reductone or formyl-4-methylphenyl hydrazine, hydroxamic acids such as phenylhydroxamic acid, p-hydroxyphenyl hydroxamic acid, and beta-alanine hydroxamic acid; a combination of azines and sulphonamidophenols, e.g. phenothiazine and 2,6-dichloro-4-benzenesulphonamidophenol; alpha-cyanophenylacetic acid derivatives such as ethyl-alpha-cyano-2-methylphenylacetate, ethyl alpha-cyanophenylacetate; bis-beta-naphthols as illustrated by 2,2′-dihydroxy-1,1′-binaphthyl, 6,6′-dibromo-2,2′-dihydroxy-1,1′-binaphthyl, and bis(2-hydroxy-1-naphthyl)methane; a combination of bis-beta-naphthol and a 1,3-dihydroxybenzene derivative, e.g. 2,4-dihydroxy-benzophenone or 2′4′-dihydroxyacetophenone; 5-pyrazolones such as 3-methyl-1-phenyl-5-pyrazolone; reductones as illustrated by dimethylamino hexose reductone, anhydro dihydro amino hexose reductone, and anhydro dihydro piperidino hexose reductone; sulphonamidophenol reducing agents such as 2,6-dichloro-4-benzenesulphonoamidophenol, and p-benzenesulphonamidophenol; 2-phenylindane-1,3-dione and the like; chromans such as 2,2-dimethyl-7-t-butyl-6-hydroxychroman; 1,4-dihydro-pyridines such as 2,6-dimethoxy-3,5-dicarbethoxy-1,4-dihydropyridine; bisphenols e.g. bis(2-hydroxy-3-t-butyl-5-methylphenyl)methane, 2,2-bis(4-hydroxy-3-methylphenyl)propane, 4,4-ethylidene-bis(2-tert-butyl-6-methylphenol), and 2,2-bis(3,5-dimethyl-4-hydroxyphenyl)propane; ascorbic acid derivatives, e.g. 1-ascorbylpalmitate, ascorbylstearate and unsaturated aldehydes and ketones such as benzil and diacetyl; 3-pyrazolidones and certain indane-1,3-diones.

A fundamental difference exists between the requirements of a black and white system and that of a colour system in dry silver materials. In the black and white system what is required is a black image, which is generally obtained from the silver formed. The literature discloses additives, "toners", which improve the black image. The silver itself may be formed in a variety of particle sizes and generally gives a brownish image. The toning hue cannot always be predicted. Addition of toners produces different types of silver precipitation and can be used in black and white dry silver to enhance the black colour characteristics of the image.

Examples of toners include phthalimide and N-hydroxyphthalimide; cyclic imides such as succinimide, pyrazolin-5-ones, and a quinazolinone, 3-phenyl-2-pyrazolin-5-one, 1-phenylurazole, quinazoline, and 2,4-thiazolidinedione; naphthalimides, e.g. N-hydroxy-1,8-naphthalimide; cobalt complexes, e.g. cobaltic hexammine trifluoroacetate; mercaptans as illustrated by 3-mercapto-1,2,4-triazole, 2,4-dimercaptopyrimidine, 3-mercapto-4,5-diphenyl-1,2,4-triazole, and 2,5-dimercapto-1,3,4-thiadiazole; N-(aminomethyl)aryl dicarboximides, e.g. N-(dimethylaminomethyl)-phthalimide, and N-(dimethylaminomethyl)naphthalene-2,3-dicarboximide; and a combination of blocked pyrazoles, isothiuronium derivatives and certain photobleach agents, e.g. a combination of N,N′-hexamethylene bis(1-carbamoyl-3,5-dimethylpyrazole), 1,8-(3,6-diazaoctane)bis-(isothiuronium trifluoroacetate) and 2-(tri-bromomethylsulphonyl)benzothiazole); and merocyanine dyes such as 3-ethyl-5[(3-ethyl-2-benzothiazolinylidene)-1-methylethylidene]-2-thio-2,4-oxazolidinedione; phthalazinone, phthalazinone derivatives or metal salts of these derivatives such as 4-(1-naphthyl)phthalazinone, 6-chlorophthalazinone, 5,7-dimethoxyphthalazinone, and 2,3-dihydro-1,4-phthalazinedione; a combination of phthalazinone plus sulphinic acid derivatives, e.g. 6-chlorophthalazinone plus sodium benzene sulphinate or 8-methylphthalazinone plus sodium p-toluenesulphinate; a combination of phthalazinone plus phthalic acid; a combination of phthalazine (including an adduct of phthalazine and maleic anhydride) and at least one compound consisting of a phthalic acid, a 2,3-naphthalene dicarboxylic acid or an o-phenylene acid derivative and anhydrides thereof, e.g. phthalic acid, 4-methylphthalic acid, 4-nitrophthalic acid, and tetrachlorophthalic anhydride; quinazolinediones, benzo-oxazine or naphthoxazine derivatives; rhodium complexes functioning not only as tone modifiers but also as sources of halide ion for silver halide formation in situ, such as ammonium hexachlororhodate (III), rhodium bromide, rhodium nitrate and potassium hexachlororhodate (III); inorganic peroxides and persulphates, e.g. ammonium peroxydisulphate and hydrogen peroxide; benzoxazine-2,4-diones such as 1,3-benzoxazine-2,4-dione; 8-methyl-1,3-benzoxazine-2,4-dione, and 6-nitro-1,3-benzoxazine-2,4-dione; pyrimidines and asym-triazines, e.g. 2,4-dihydroxypyrimidine, 2-hydroxy-4- aminopyrimidine, and azauracil, and tetrazapentalene derivatives, e.g. 3,6-dimercapto-1,4-diphenyl-1H,4H-2,3a,5,6a-tetrazapentalene, and 1,4-di(o-chlorophenyl)3,6-dimercapto-1H,4H-2,3a,5,6a-tetrazapentalene.

A substantially different result is desired in a colour system. One does not want a black or grey silver image as this affects the overall colour intensity and rendition of the dye species. A number of methods have been proposed for obtaining colour images with dry silver systems. Such methods include incorporated coupler materials, e.g. a combination of silver benzotriazole, well known magenta, yellow and cyan dye-forming couplers, aminophenol developing agents, a base release agent such as guanidinium trichloroacetate and silver bromide in poly(vinyl butyral); a combination of silver bromoiodide, sulphonamidophenol reducing agent, silver behenate, poly(vinyl butyral), an amine such as n-octadecylamine and 2-equivalent or 4-equivalent cyan, magenta or yellow dye-forming couplers; incorporating leuco dye bases which oxidises to form a dye image, e.g., Malachite Green, Crystal Violet and pararosaniline; a combination of in situ silver halide, silver behenate, 3-methyl-1-phenylpyrazolone and N,N'-dimethyl-p-phenylenediamine hydrochloride; incorporating phenoic leuco dye reducing agents such as 2-(3,5-di-tert-butyl-4-hydroxyphenyl)-4,5-diphenylimidazole, and bis(3,5-di-tert-butyl-4-hydroxyphenyl)phenylmethane; incorporating azomethine dyes or azo dye reducing agents; silver dye bleach process, e.g. an element comprising silver behenate, behenic acid, poly(vinyl butyral), poly(vinyl-butyral) peptized silver bromiodide emulsion, 2,6-dichloro-4-benzenesulphonamidophenol, 1,8-(3,6-diazaoctane)bis-isothiuronium-p-toluene sulphonate and an azo dye was exposed and heat processed to obtain a negative silver image with a uniform distribution of dye which was laminated to an acid activator sheet comprising polyacrylic acid, thiourea and p-toluene sulphonic acid and heated to obtain well defined positive dye images; and incorporating amines such as aminoacetanilide (yellow dye-forming), 3,3-dimethoxybenzidine (blue dye-forming) or sulphanilanilide (magenta dye-forming) which react with the oxidised form of incorporated reducing agents such as 2,6-dichloro-4-benzene-sulphonamido-phenol to form dye images. Neutral dye images can be obtained by the addition of amines such as behenylamine and p-anisidine.

There has been a very strong, specific continuing need for improved photothermographic materials for providing a developed image in colour. Ideal characteristics required for the image forming dyes are as follows:

(a) the dye precursors should assist in the toning action of the silver to give as low a visual density of silver metal as possible,
(b) the dyes must have a hue suitable for three colour reproduction,
(c) the dyes must have large molecular extinction coefficients,
(d) the dyes must be stable to light, heat and in the presence of other additives in the system, such as the dye releasing activator,
(e) the dye precursors must be easily synthesised.

It has been found that a range of benzylidene leuco compounds are capable of dye formation in dry silver systems.

BRIEF SUMMARY OF THE INVENTION

Therefore according to the present invention there is provided a photothermographic element comprising a support bearing a photothermographic medium, the medium comprising a light sensitive silver halide in reactive association with a silver salt of an organic acid and a colour generating reducing agent which is a leuco compound oxidisable by silver ions into a coloured dye of the general formula:

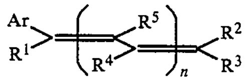

in which:

n=0, 1 or 2, $R^1$ represents H, CN, lower alkyl of 1 to 5 carbon atoms, aryl or $COOR^6$ in which $R^6$ is lower alkyl of 1 to 5 carbon atoms or aryl of up to 8 carbon atoms, $R^2$ and $R^3$ independently represent CN, $NO_2$, $COOR^6$, $SO_2R^6$, $CONHR^6$ in which $R^6$ is as defined above, or $R^2$ and $R^3$ together represent the necessary atoms to form a 5- or 6-membered carbocyclic or heterocyclic ring having ring atoms selected from C, N, O and S atoms, which carbocyclic or heterocyclic rings possess at least one conjugated electron withdrawing substituent, $R^4$ and $R^5$ independently represent H, CN or lower alkyl of 1 to 5 carbon atoms or together represent the necessary atoms to complete a 5- or 6-membered carbocyclic ring, and Ar represents:

(a) a thienyl group which may be substituted with one or more lower alkyl groups of 1 to 5 carbon atoms,
(b) a furyl group which may be substituted with one or more lower alkyl groups of 1 to 5 carbon atoms or
(c) a phenyl group which may be substituted with one or more groups selected from halogen, hydroxy, lower alkyl of 1 to 5 carbon atoms, lower alkoxy of 1 to 5 carbon atoms, $NR^7R^8$ in which $R^7$ and $R^8$ are independently selected from H; lower alkyl group of 1 to 5 carbon atoms which may possess substituents selected from CN, OH, halogen and phenyl, and phenyl group optionally substituted with substituents selected from OH, halogen, lower alkyl of 1 to 5 carbon atoms or lower alkoxy of 1 to 5 carbon atoms or $R^7$ and $R^8$ together represent the necessary atoms to complete a morpholino group, or said phenyl group may be part of a larger ring structure comprising two or more rings which may be aromatic or heterocyclic containing up to 20 ring atoms selected from C, N, O and S.

DESCRIPTION OF PREFERRED EMBODIMENT

The leuco compounds employed as colour generating reducing agents in the invention are the reduced form of the coloured dyes of the above general formula. The reduced form of the dyes must absorb less strongly in the visible region of the electromagnetic spectrum and be oxidised by silver ions back to the original coloured form of the dye.

Benzylidene dyes have extremely sharp spectral characteristics giving high colour purity of low grey level.

The dyes have large extinction coefficients typically in the order of $10^4$ to $10^5$ and possess good compatibility and heat/light stability. The dyes are readily synthesised and the reduced leuco forms of the compounds are very stable.

The heat-developable colour photographic material can simultaneously provide a toned silver image and dye formation. That is, when the heat-developable colour photographic material of the present invention is imagewise exposed to light and developed by heating, an oxidation-reduction reaction occurs between the exposed light-sensitive silver halide and/or an organic silver salt and the leuco dye compound in an area where the exposed light-sensitive silver halide exists to form a silver image in the exposed area plus dye image. The aforementioned silver image appears to have a neutral density due to in situ toning action of the leuco compound. According to this process, an unreacted leuco compound does not form a coloured image during processing.

The light sensitive silver halide used in the present invention can be employed in a range of 0.0005 mol to 5 mol and, preferably, from 0.005 mol to 1.0 mol per mole of organic silver salt.

Examples of silver halide which may be used in the invention include silver chloride, silver chlorobromide, silver chloroiodide, silver bromide, silver iodobromide, silver chloroiodobromide and silver iodide.

The silver halide used in the present invention may be employed without modification. However, it may be chemically sensitised with a chemical sensitising agent such as a compound containing sulphur, selenium or tellurium etc. or a compound containing gold, platinum, palladium, rhodium or iridium, etc., a reducing agent such as a tin halide, etc. or a combination thereof. The details of these procedures are described in T. H. James "The Theory of the Photographic Process", Fourth Edition, Chapter 5, pages 149 to 169.

The organic silver salt which can be used in the present invention is a silver salt which is comparatively stable to light and which forms a silver image by reacting with the above described leuco compound or an auxilliary developing agent which is coexisting with the leuco compound, if desired, when it is heated to a temperature of above 80° C., and, preferably, above 100° C. in the presence of exposed silver halide.

Suitable organic silver salts include silver salts of organic compounds having a carboxy group. Preferred examples thereof include a silver salt of an aliphatic carboxylic acid and a silver salt of an aromatic carboxylic acid. Preferred examples of the silver salts of aliphatic carboxylic acids include silver behenate, silver stearate, silver oleate, silver laurate, silver caprate, silver myristate, silver palmitate, silver maleate, silver fumarate, silver tartarate, silver furoate, silver linoleate, silver butyrate and silver camphorate, mixtures thereof, etc. Silver salts which are substituted with a halogen atom of a hydroxyl group can also be effectively used. Preferred examples of the silver salts of aromatic carboxylic acid and other carboxyl group-containing compounds include silver benzoate, a silver substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenyl benzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663, etc.

Silver salts of compounds containing mercapto or thione groups and derivatives thereof can be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(s-ethylglycolamido) benzothiazole, a silver salt of thioglycolic acid such as a silver salt of a S-alkyl thioglycolic acid (wherein the alkyl group has fromm 12 to 22 carbon atoms) as described in Japanese patent application No. 28221/73, a silver salt of a dithiocarboxylic acid such as a silver salt of dithioacetic acid, a silver salt of thioamide, a silver salt of 5-carboxyl-1-methyl-2-phenyl-4-thiopyridine, a silver salt of mercaptotriazine, a silver salt of 2-mercaptobenzoxazole, a silverr salt a described in U.S. Pat. No. 4,123,274, for example, a silver salt of 1,2,4-mercaptotriazole derivative such as a silver salt of 3-amino-5-benzylthio-1,2,4-triazole, a silver salt of thione compound such as a silver salt of 3-(2-carboxyethyl)-4-methyl-4-thiazoline-2-thione as disclosed in U.S. Pat. No. 3,301,678.

Furthermore, a silver salt of a compound containing an imino group can be used. Preferred examples of these compounds include a silver salt of benzotriazole and a derivative thereof as described in Japanese patent publications Nos. 30270/69 and 18146/70, for example, a silver salt of benzotriazole, a silver salt of alkyl substituted benzotriazole such as silver salt of methylbenzotriazole, etc., a silver salt of a halogen substitued benzotraizole such as a silver salt of 5-chlorobenzotriazole, etc., a silver salt of carboimidobenzotriazole, etc., a silver of 1,2,4-triazole, of 1-H-tetrazole as described in U.S. Pat. No. 4,220,709, a silver salt of imidazole and an imidazole derivative, and the like.

The silver halide and the organic silver salt which form a starting point of development should be in reactive association i.e. in the same layer, in adjacent layers or layers separated from each other by an intermediate layer having a thickness of less than 1 micron. It is preferred that the silver halide and the organic silver salt are present in the same layer.

The silver halide and the organic silver salt which are separately formed in a binder can be mixed prior to use to prepare a coating solution, but it is also effective to blend both of them in a ball mill for a long period of time. Further, it is effective to use a process which comprises adding a halogen-containing compound in the organic silver salt prepared to partially convert the silver of the organic silver salt to silver halide.

Methods of preparing these silver halide and organic silver salts and manners of blending them are described in Research Disclosure, No. 17029, Japanese patent application Nos. 32928/75 and 42529/76, U.S. Pat. No. 3,700,458, and Japanese patent application Nos. 13224/74 and 17216/75.

A suitable coating amount of the light-sensitive silver halide and the organic silver salt employed in the present invention is in a total from 50 mg to 10 g/$m^2$ calculated as an amount of silver as disclosed, for example, in U.S. Pat. No. 4,478,927.

The dyes generated by the leuco compounds employed in the elements of the invention are known and are disclosed, for example, in:

Colour Index 1971, Vol 4, page 4437 published by The Society of Dyes and Colourists, The Chemistry of Synthetic Dyes, K. Venkataraman 1952 Vol. 2, Academic Press, Page 1206, U.S. Pat. No. 4,478,927, The Cyanine Dyes and Related Compouns, R. M. Hamer, 1964, J. Wiley & Sons Ltd., Publishers pages 471–475, and The Cyanine Dyes and Related Compounds, F. M. Hamer, 1964 page 492 J. Wiley and Sons Ltd, Publishers.

The leuco compounds may readily be synthesised by techniques known in the art. There are many known methods of synthesis from precursors since the reaction is a simple two hydrogen reduction step. Suitable metho s are disclosed, for example, in:

N. Kucharczyk et al. Collect. Czech. Chem. Commun. 1968 33(1) 92-9 CA 68(11): 49384W, T. Dumpis et al. Dokl. Akad. Nauk. S.S.S.R. 1961 141 1093; ibid 1962 142 1308, T. Dumpis et al. Dokl. Akad. Nauk. S.S.S.R. 1959 125 549; Latvijas PSR Zinatnu Akad. Vestis 1961 (2) 241.

F. X. Smith et al. Tetrah. Letts 1983 24 (45) 4951–4954,

X. Huang. L. Xie, Synth. Commun. 1986 16(13) 1701–1707,

H. Zimmer et al. J. Org. Chem 1960 25 1234–5,

M. Sekiya et al. Chem. Pharm. Bull. 1972 20(2), 343. ibid 1974 22(2) 448, and

T. Sohda et al. Chem. Pharm. Bull. 1983 31(2) 560-569.

Preferred leuco compounds/dyes used in the invention are of the formula:

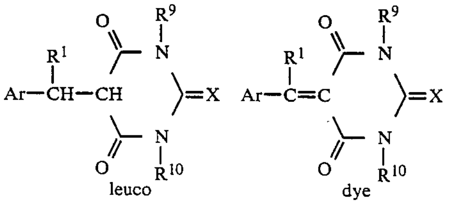

leuco dye in which:

X is O or S, preferably O

Ar and $R^1$ are as defined above, $R^9$ and $R^{10}$ independently represent lower alkyl groups of 1 to 5 carbon atoms, aralkyl groups of up to 10 carbon atoms or phenyl.

Other preferred dye formed by oxidation of the leuco compounds used in the invention include those of the formula:

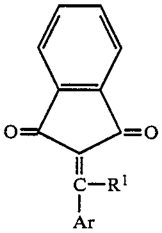

in which:

Ar and $R^1$ are as defined above.

Examples of dyes generated by the leuco compounds used in the invention are reported in the following Tables.

Barbituric Acid Derivatives of the formula:

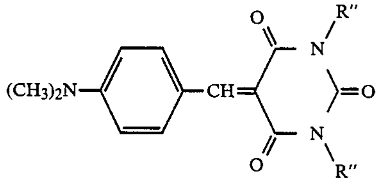

| Compound No. | $R^{11}$ | λmax (ethanol) nm |
|---|---|---|
| 1 | $CH_3$ | 468 |
| 2 | $CH_2CH_3$ | 468 |
| 3 | n-$C_8H_{17}$ | 470 |
| 4 | tert-butyl | 449 |
| 5 | cyclohexyl | 468 |

| COMPOUND | FORMULA | MAX(ETHANOL) nm |
|---|---|---|
| 6 | 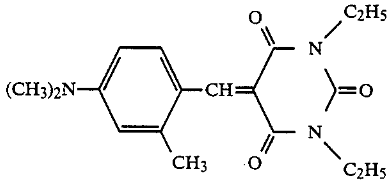 | 483 |
| 7 | 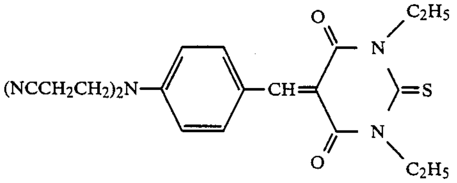 | 475 |

-continued
| COMPOUND | FORMULA | MAX(ETHANOL) nm |
|---|---|---|
| 8 | 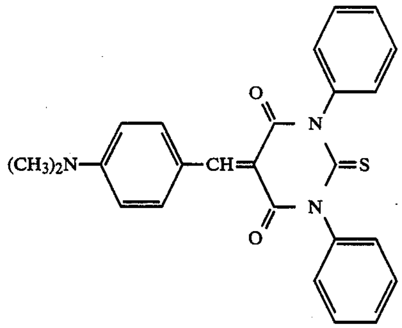 | 510 |
| 9 | 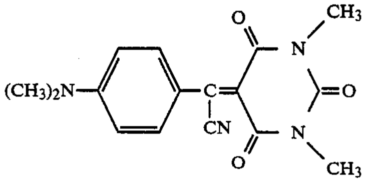 | 600 ($CHCl_3$) |
| 10 | 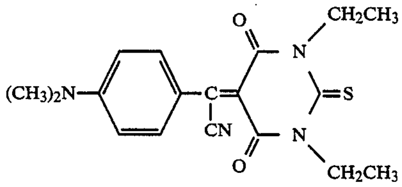 | 623 ($CHCl_3$) |
| 11 | 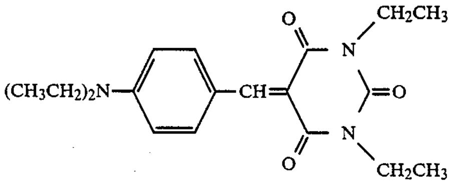 | 468 |
| 12 | 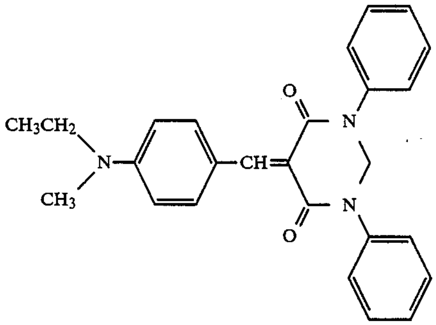 | |
| 13 | 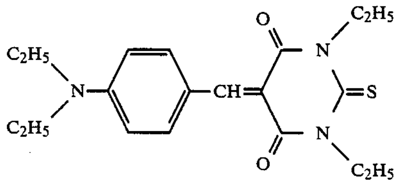 | |

-continued
| COMPOUND | FORMULA | MAX(ETHANOL) nm |
|---|---|---|
| 14 | 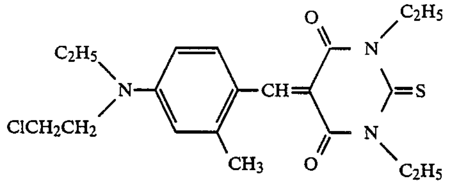 | |
| 15 | 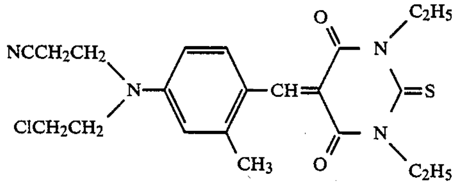 | |
| 16 | 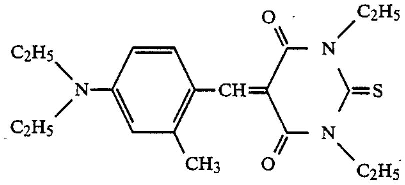 | |
| 17 | 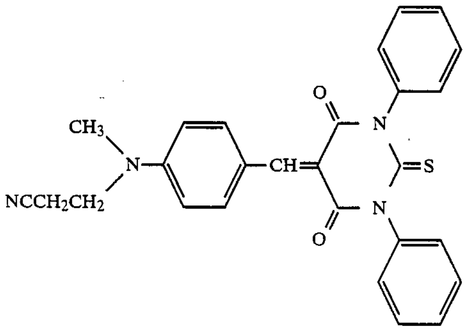 | |
| 18 | 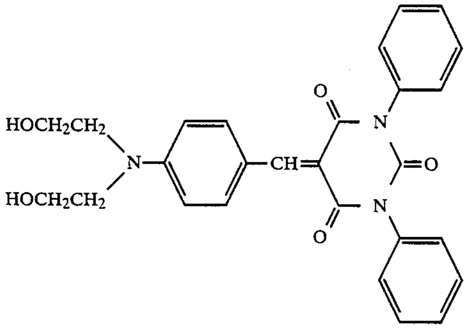 | |
| 19 | 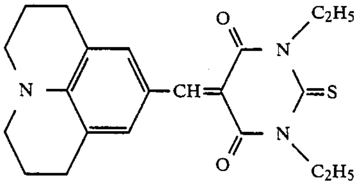 | |

-continued
| COMPOUND | FORMULA | MAX(ETHANOL) nm |
| --- | --- | --- |
| 20 | 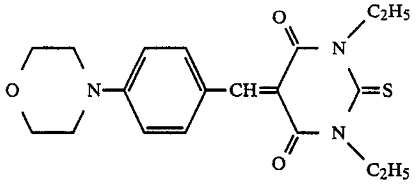 | |
| 21 | 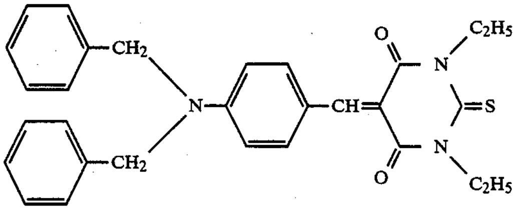 | |
| 22 | 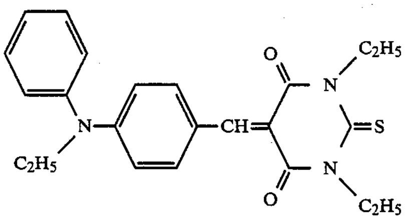 | |
| 23 | 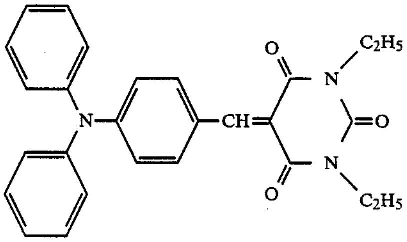 | |
| 24 | 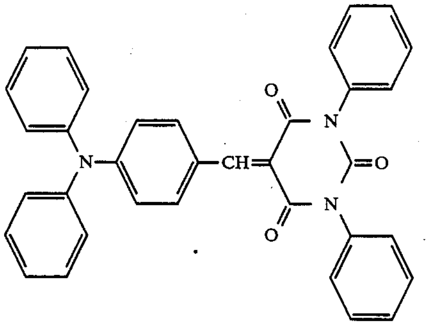 | |
| 25 | 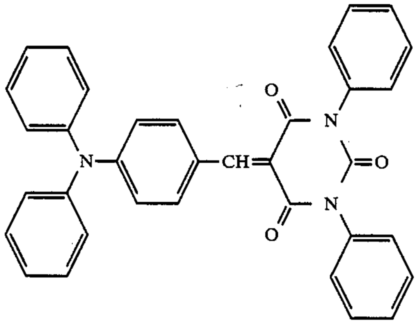 | |

-continued
| COMPOUND | FORMULA | MAX(ETHANOL) nm |
|---|---|---|
| 26 | 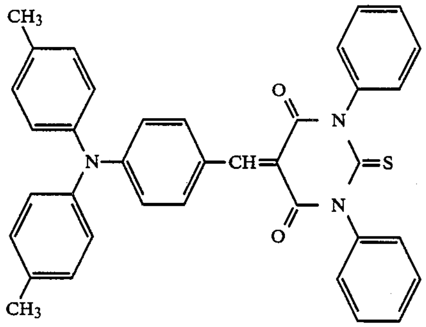 | |
| 27 | 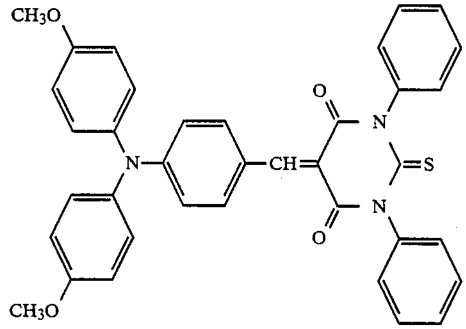 | |
| 28 | 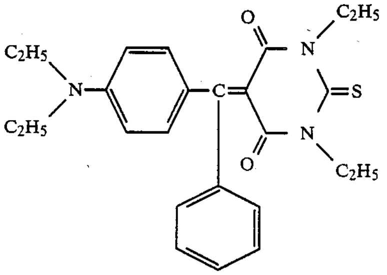 | |
| 29 | 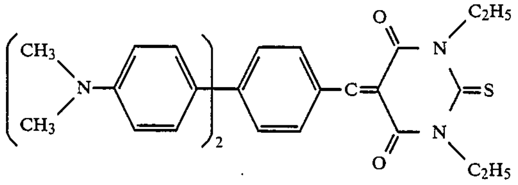 | |
| 30 | 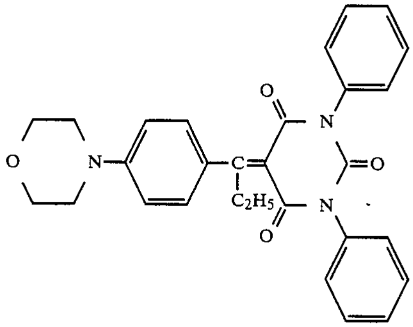 | |

-continued
| COMPOUND | FORMULA | MAX(ETHANOL) nm |
|---|---|---|
| 31 | 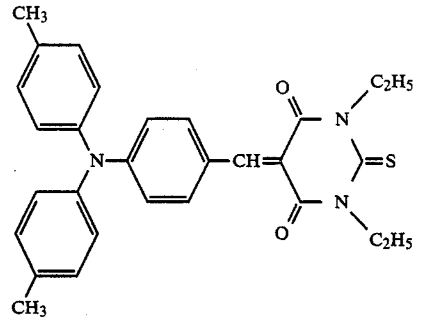 | |
| 32 | 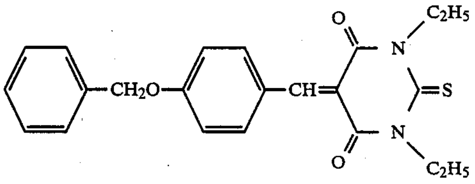 | |
| 33 | 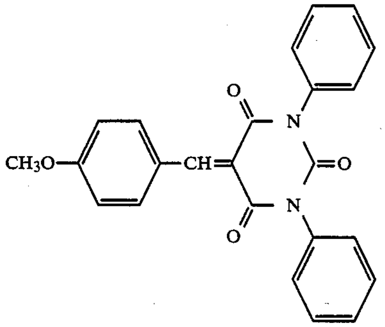 | |
| 34 | 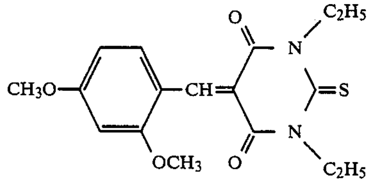 | |
| 35 | 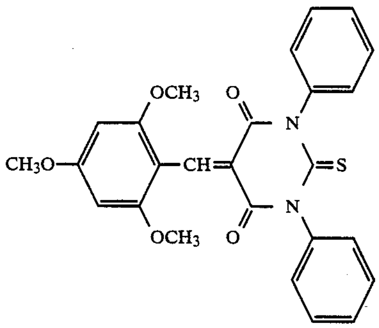 | |
| 36 | 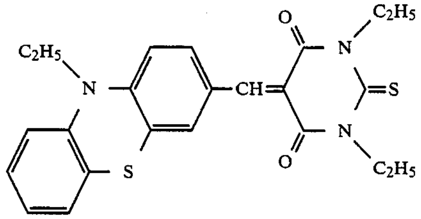 | |

-continued
| COMPOUND | FORMULA | MAX(ETHANOL) nm |
|---|---|---|
| 37 | 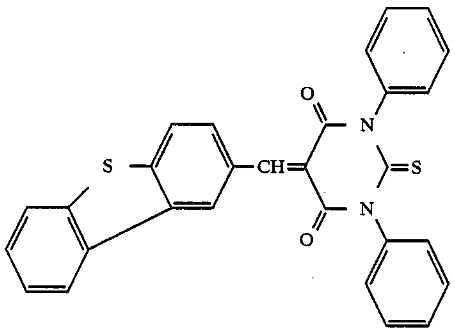 | |
| 38 | 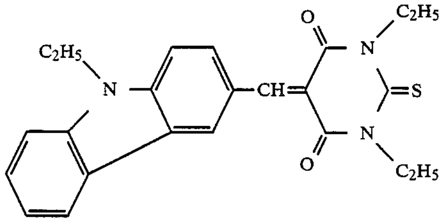 | |
| 39 | 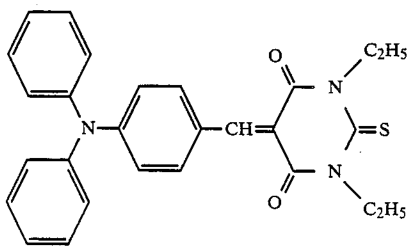 | |
| 40 | 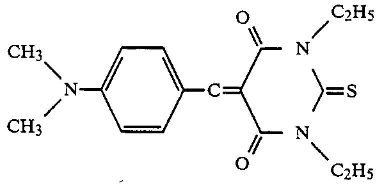 | |
| 41 | 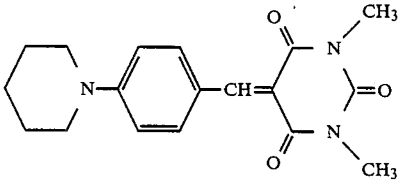 | |
| 42 | 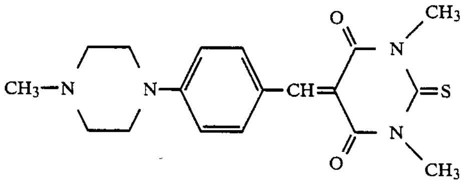 | |

-continued
| COMPOUND | FORMULA | MAX(ETHANOL) nm |
|---|---|---|
| 43 | 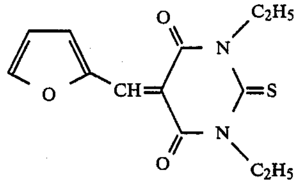 | |
| 44 | 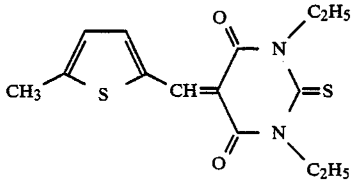 | |
| 45 | 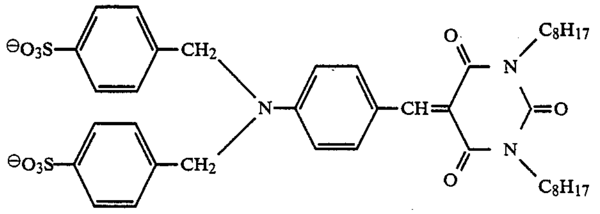 | |
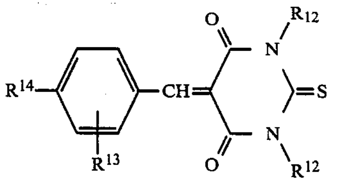
| Compound No. | $R^{12}$ | $R^{14}$ | $R^{13}$ | λmax (ethanol) nm |
|---|---|---|---|---|
| 46 | H | $OCH_3$ | H | 402 |
| 47 | $C_2H_5$ | $OCH_3$ | H | 410 |
| 48 | $C_2H_5$ | $OCH_3$ | m-$OCH_3$ | 420 |
| 49 | $C_2H_5$ | $OCH_3$ | o-$OCH_3$ | 440 |
Dyes incorporating nuclei other than barbituric acid:
| | λmax (ethanol) |
|---|---|
| 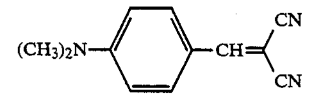 | 430 |
| 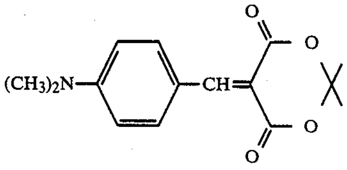 | 470 |
| 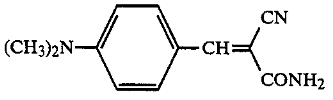 | 404 |
-continued
| | λmax (ethanol) |
|---|---|
| 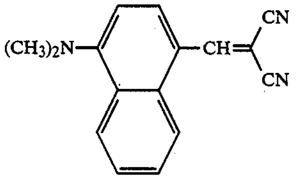 | 456 |
| 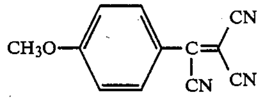 | 398 |
| 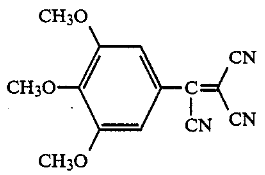 | 436 |
| 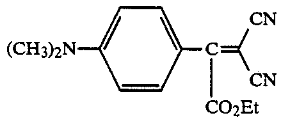 | 440 |
| 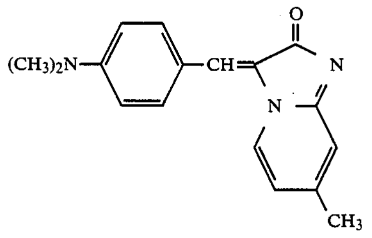 | 502 |

-continued

| | λmax (ethanol) |
|---|---|
| 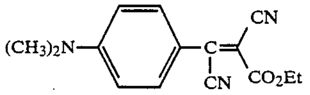 | 490($CHCl_3$) |
| 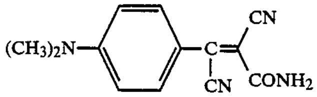 | 535 |
| 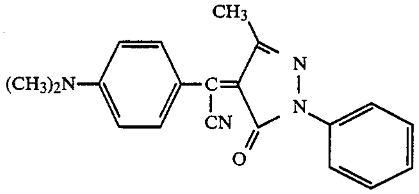 | 534 |
| 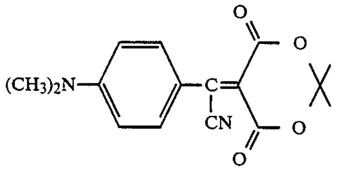 | 560 |

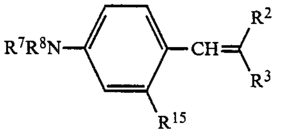

| Compound No. | $R^2$ | $R^3$ | $R^7R^{8(1)}$ | $R^{15}$ | λmax (ethanol) nm |
|---|---|---|---|---|---|
| 62 | CN | CN | $CH_2CH_2CN$ | H | 410 |
| 63 | CN | CN | $R^7 = CH_3$<br>$R^8 = CH_2CH_2CN$ | H | 421 |
| 64 | CN | $CO_2CH_3$ | $CH_3$ | H | 417 |
| 65 | CN | $CO_2CH_3$ | $CH_2CH_2CN$ | H | 399 |
| 66 | CN | $CO_2CH_3$ | $R^7 = CH_3$<br>$R^8 = CH_2CH_2CN$ | H | 413 |
| 67 | CN | $CO_2Et$ | $CH_2CH_2CN$ | H | 403 |
| 68 | CN | $CONH_2$ | $CH_2CH_2CN$ | H | 392 |
| 69 | CN | CONHPh | $CH_2CH_2CN$ | H | 400 |
| 70 | CN | $CO_2CH_3$ | $R^7 = CH_2CH_2$<br>O<br>$R^8 = CH_2CH_2$ | H | 405 |
| 71 | CN | $CO_2CH_2CH{=}CH_2$ | $CH_2CH_2CN$ | H | 403 |
| 72 | CN | $CO_2CH_2CH{=}CH_2$ | $R^7 = CH_3$<br>$R_2{=}CH_2CH_2CN$ | H | 415 |
| 73 | CN | CN | $CH_2CH_2CN$ | $CH_3$ | 423 |

(1)$R^7 = R^8$ unless otherwise stated.

Dimeric and polymeric dyes of the formula:

| NO. | | λmax (ethanol) |
|---|---|---|
| 74 | 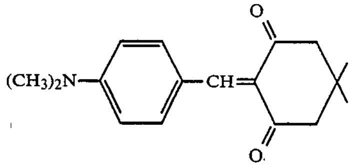 | 458 |

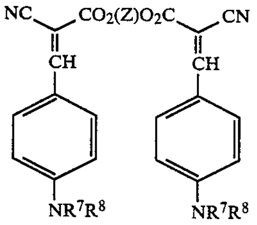

| No. | Z | $R^7$ $R^8$ | λmax (ethanol) |
|---|---|---|---|
| 75 | $-CH_2CH_2-$ | $CH_3$ | 424 |
| 76 | $-CH_2CH_2-$ | $CH_2CH_2CN$ | 404 |
| 77 | $-CH_2CH_2-$ | $R^7CH_2CH_2$<br>O<br>$R^8CH_2CH_2$ | 411 |
| 78 | $-CH_2CH_2OCH_2CH_2-$ | $CH_3$ | 423 |
| 79 | $-CH_2CH_2OCH_2CH_2-$ | $R^7CH_3$<br>$R^8CH_2CH_2CN$ | 413 |

-continued
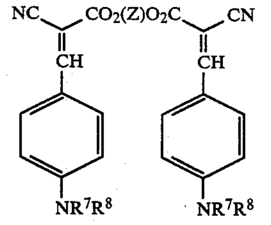
| No. | Z | $R^7$ $R^8$ | λmax (ethanol) |
|---|---|---|---|
| 80 | $-(CH_2CH_2O)_2CH_2CH_2-$ | $CH_3$ | 425 |
| 81 | $-(CH_2CH_2O)_2CH_2CH_2-$ | $R^7CH_3$ $R^8CH_2CH_2CN$ | 415 |
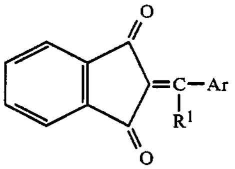
| Compound No. | Ar | $R^1$ | λmax(MeOH)nm |
|---|---|---|---|
| 88 | 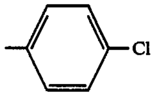 | H | 343 |
| 89 | 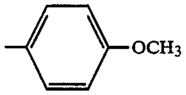 | H | 381 |
| | | λmax |
|---|---|---|
| 82 | 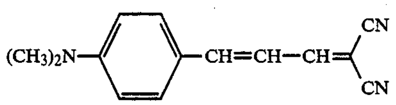 | 520 |
| 83 | 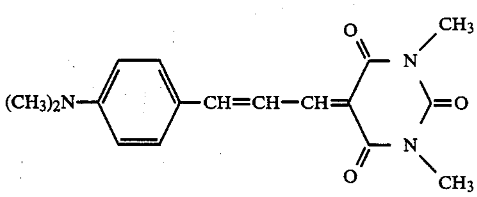 | 535 |
| 84 | 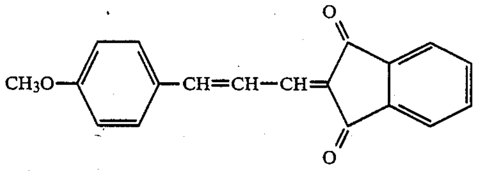 | 426($CH_3OH$) |
| 85 | 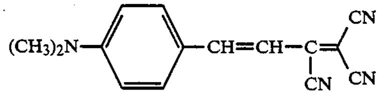 | 590($CHCl_3$) |
| 86 | 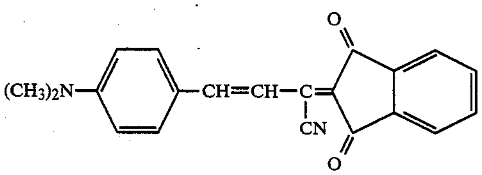 | 620 |
| 87 | 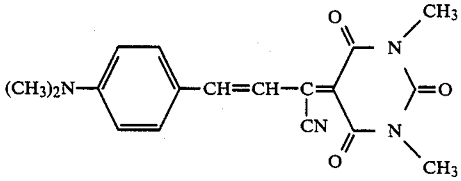 | 636 |

-continued

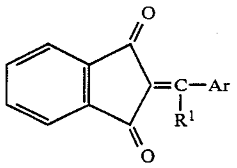

| Compound No. | Ar | $R^1$ | λmax(MeOH)nm |
|---|---|---|---|
| 90 | 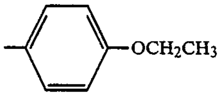 | H | 384 |
| 91 | 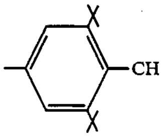 | H | 414(584)* |
| 92 | 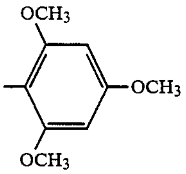 | H | 428 |
| 93 | 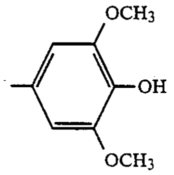 | H | 436(538)* |
| 94 | 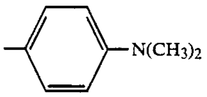 | H | 482 |
| 95 | 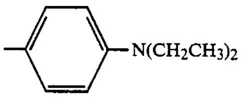 | H | 490 |
| 96 | 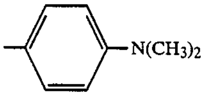 | CN | 570($CHCl_3$) |

*λmax pH dependent.

| | | λmax(nm) |
|---|---|---|
| 97 | 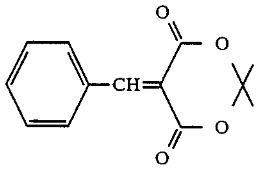 | |

-continued

| | | λmax(nm) |
|---|---|---|
| 98 | 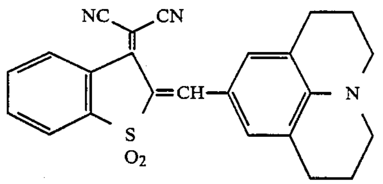 | 630 |
| 99 | 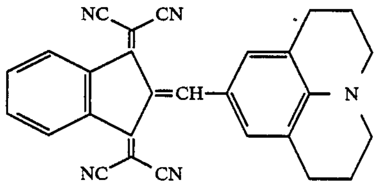 | 665 |
| 100 | 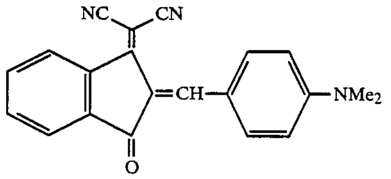 | 553 |

Exemplary methods of preparing dyes used in the invention are as follows:

Synthesis of (p-Dimethylaminobenzylidene dimethylbarbituric acid (Compound No. 1)

A mixture of dimethylamino-benzaldehyde (47.66 g) and N,N-dimethyl-barbituric acid (52.0 g) was heated in ethanol (500 ml) at 60° C. for 4 hours, triethylamine (1 ml) having been added as catalyst. The precipitated dye was filtered, washed with ethanol (200 ml) and dried. Yield 89.6 g (94%).

Synthesis of the Leuco Form of Compound No. 1

42.6 g of Compound No. 1 was dissolved in a mixture of ethanol (500 ml) and glacial acetic acid (84 ml). Zinc dust (79.4 g) was added portionwise over a period of 2 hours. The mixture was then heated to 60° C. and sonicated. When all the colour had discharged the suspension was filtered and the residue washed with ethanol. The combined extracts were evaporated under vacuum to give an oily solid. Ethanol (100 ml) was then added and the solid crystallised fully. The solid was filtered, washed with more ethanol (200 ml) and dried in a vacuum over 2 days to yield a white dry solid.

Synthesis of [4-dimethylamino-1-naphthalylidene]malononitrile (Compound No. 53)

A mixture of 4-dimethylamino-1-naphthaldehyde (4.8 g) and malononitrile (1.59 g) were heated in ethanol (200 ml) with triethylamine (0.5 ml) as catalyst. The reaction was heated to 60° C. for 4 hours then reduced in volume to 50 ml. The mixture was left overnight to crystallise.

Yield 5.4 g (92%): λmax 456 nm (EtOH), λmax 452 nm ($CH_3OH$): $\epsilon=2.1\times10^4$.

Analysis for $C_{16}H_{13}N_3$:

| | C % | H % | N % |
|---|---|---|---|
| Calculated | 77.71 | 5.30 | 16.99 |

-continued

| | C % | H % | N % |
|---|---|---|---|
| Found | 77.55 | 5.43 | 17.51 |

Synthesis of Leuco Form of Compound No. 53

Compound No. 53 (4.95 g) was dispersed in ethanol (100 ml) and glacial acetic acid (12 g). Zinc dust (10 g) was added proportionwise with stirring. The dispersion was thenn sonicated to completely decolourise any residue solid via solubilisation and reduction. The mixture was then filtered to remove the zinc and then evaporated to dryness to remove any residue acetic acid. Ethanol (50 ml) was then added and the mixture was heated to dissolve the leuco form. The solution was cooled slowly to crystallise the leuco compound.

Initial yield of leuco compound was 0.65 g in the form of white crystals.

Synthesis of the Leuco Form of Compound 54

To a suspension of 2-(p-methoxybenzylidene)-malononitrile (1.83 g) in boiling ethanol (20 ml), sodium cyanide (0.5 g) in distilled water (5 ml) was added dropwise with stirring. A red solution formed which was additioned with water (100 ml) and acidified with glacial acetic acid (5 ml), at room temperature. The pale mauve precipitate formed was filtered, washed repeatedly with distilled water (500 ml) and dried in a vacuum oven.

Yield (crude) 1.92 g (91%).

'H.N.M.R. ($CDCl_3$, 90 MHz) 3.8 (s, 3H), 5.4 (d, J=9 HZ, 1H), 5.76 (d, J=9 Hz, 1H), 6.9–7.6 (m, 4H).

Synthesis of 1,1,2-tricyano-2-(3,4,5-trimethoxyphenyl)ethane (Leuco form of Compound 55)

To a suspension of 1,1-dicyano-2-(3,4,5-trimethoxyphenyl) ethene (8.5 g, 0.035 moles) in boiling ethanol (150 ml), sodium cyanide (1.77 g, 0.0351 moles) was added dropwise from a pipette. A dark solution formed which was additioned with distilled water (500 ml) and acidified with glacial acetic acid (to pH 2) at room temperature. No precipitate formed. With stirring, water (20 ml) was added, consequently precipitating out dirty white crystals. The crystals were filtered, washed repeatedly with water (500 ml) and dried in a vacuum oven. The product was recrystallised from ethanol.

Yield 6.74 g (71%).

H' NMR ($CDCl_3$, 90 MHz) 3.72 (s, 3H), 3.84 (s, 6H, 5.42 (d, J=12 Hz, 1H), 5.72 (d, J=12 Hz, 1H), 6,88 (s, 2H).

Synthesis of 2-[p-dimethylaminocinnamylidene]-N',N'-dimethyl barbituric acid (Compound No. 83)

A mixture of p-dimethylamino-cinnamaldehyde (17.5 g) and N',N'-dimethylbarbituric acid (15.6 g) were heated in ethanol (250 ml) at 70° C. for 6 hours. The dye formed, crystallised overnight. The material was filtered and washed with ethanol (220 ml).

Yield 30.54 g (94.6%) max 533.4 nm (EtOH); (EtOH)=$3.36\times10^4$.

Synthesis of Leuco Form of Compound No. 83

Compound No. 83 (3.13 g) was dispersed in ethanol (20 ml) and borane, dimethylamine complex (4.37 g) was added portionwise with stirring over a 3 hour period. The magenta dye decolourised slowly. This decolourisation was assisted by heat at 50° C. The reaction was then quenched in ice water (50 g: 50 ml) with dilute hydrochloric acid (20 ml). The single phase solution was then extracted with methylene chloride (500 ml), twice. The organic layer was separated and dried with anhydrous magnesium sulphate. Evaporation to dryness gave fawn coloured crytals. The material was washed twice with ethanol ($2\times50$ ml) and dried in a vacuum oven at room temperature.

Yield 2.05 g (65%). Off white crystals.

'H N.M.R. ($CDCl_3$ 90 MHz) 2.9 (s, 6H), 3,0 (M, 2H), 3,26 (s, 6H), 3.6 (t, J=5 Hz, 1H), 5.5–5.9 (dt, $J_d$=15 Hz, $J_t$=7.6 Hz, 1H), 6.4 (d, $J_d$=15 Hz, 1H), 6.5–7.2 (m, 4H).

General synthesis for the preparation of 2-(substituted-benzylidene)-1,3-indandiones (Compound Nos. 88 to 95)

1,3-Indandione (1.46 g, 0.01 mol) and an aromatic aldehyde (0.01 mole) are refluxed in absolute ethanol (15–25 ml) over a period of 1.5 to 3.0 hours. The heat is removed and the reaction mixture kept at room temperature until crystallisation was completed. The crystals are filtered and washed with cold ethanol followed by recrystallisation from ethanol or DMF (1 g/10 ml) and drying in vacuum oven.

General synthesis of the Leuco Forms of Compound Nos. 88 to 95

Compound No. 88 to 95 (0.01 mole) is suspended in abs. ethanol in a round bottomed flask equipped with a condenser, magnetic stirrer and nitrogen inlet. Zinc powder (2.0 g) is added at once followed by addition of 0.5 ml of concentrated hydrochloric acid. The reaction mixture is stirred at 40° to 45° C. under nitrogen gas for a period of 10 to 20 hours during which decolourisation is completed and TLC in hexane/ether (70:30) indicates no presence of starting material. The reaction mixture is filtered through a diatomaceous earth layer "Celite". The filtrate is concentrated on a rotary evaporator and refrigerated to give crystals. The crystals are filtered, air dried and recrystallised from a suitable solvent. During recrystallisation the temperature is kept to below 50° C.

Synthesis of 2-[-Cyano-2-dimethylaminophenyl]-ethyl-1,3-indandione-Leuco Form Compound No. 96

To a stirred suspension of 1.4 g of 2-(p-dimethylaminobenzylidene) indandione in 20 ml boiling ethanol was added an aqueous solution of 0.5 g sodium cyanide in 5 ml water. After the dye had bleached, the solution was cooled to room temperature and 100 ml water acidified with acetic acid was added. The precipitate was filtered, washed repeatedly with distilled water and dried.

Yield 1.3 g (85%).

NMR, ($CDCl_3$: 2.85 (S, $CH_3$, 6H); 3. (D, CH, 1H); 4.7 (D, CH, 1H); 6.5; 7.9 (M, ArH, 8H).

The leuco compound may be placed in a layer with the silver salt and light sensitive silver halide. It may alternatively be placed in a separate layer provided that the compound can react during development. The optimum placement of the leuco compound will, for example, depend on the choice of binder.

The coatings used in the following experimental were derived from silver behenate dispersions and in particular silver behenate half soaps. The half soaps are behenic acid dispersions where only about half the behenic acid has been reacted to form the silver salt. The other half remains as behenic acid.

The method used for making silver soap dispersions is well known in the art and is disclosed in Research Disclosure April 1983 (22812), ibid October 1983 (23419) and U.S. Pat. No. 3,985,565.

The following silver soap dispersion was used in the Examples.

The leuco compounds of the invention have oxidation potentials within the range 0.65 to 1.2 volts. This may be influenced by the environment around the leuco compound.

The following Table shows the effect of pH and moisture on the oxidation potentials of the leuco forms of compound Nos. 1 and 7. Because of the influence of acidity and moisture content of binders, consideration must be given to where the leuco compound is to be placed in the overall construction.

| | OXIDATION POTENTIALS (V) IN | | | | |
|---|---|---|---|---|---|
| LEUCO FORM OF COMPOUND NO. | EtOH + alkali | EtOH | EtOH + acid | EtOH/$H_2O$ | EtOH/$H_2O$ plus acid |
| 1 | — | +0.71 & 1.08 | 0.96 & 1.3 | +0.63 & 0.93 | +0.93 |
| 7 | +0.62 & 0.93 | +0.88 | +0.93 | — | — |

127 g of the 15% silver soap dispersion was mixed with 0.1 g of polyvinylbutyral resin (Butvar B-76). 12 ml of mercuric bromide solution (2.36 g/100 ml of methanol) was added with stirring after which an additional 68 g of Butvar B-76 was added. Methyl ethyl ketone (180 g) and 180 g of additional toluene were added to obtain the proper coating viscosity. To this dispersion was then added blue sensitising dye.

The dispersion was coated at a wet thickness of 76 microns and dried at 82° C. in an oven for 5 minutes. A topcoat was applied over this coating comprising

| | |
|---|---|
| Leuco Compound | 0.2 g |
| Dimethylformamide | 3 ml |
| Phthalazinone | 0.2 g |
| Butvar B76 (15% in methyl ethyl ketone) | 10 g |

This was coated at 76 micron wet thickness and dried at 70° C. for 4 minutes. The leuco compound was therefore placed in the topcoat.

As an alternative to incorporating the leuco compound in a topcoat employing an organic solvent based coating formulation, further examples were prepared where an aqueous based, polyvinyl alcohol, topcoat was employed. Here the leuco compound was incorporated in the silver halide layer rather than in the topcoat. It was added in a quantity of 0.45% relative to the total coating formulation at the time of addition of the blue sensitising dye.

This was then given a topcoat of:

5% polyvinyl alcohol (Vinol® 523) dissolved in a 50:50 mixture of water and methanol and containing 0.4% phthalazinone which was coated at 76 micron wet and dried for 5 minutes at 70° C.

Samples were exposed to a white light source through a step wedge and developed by heating to 120° to 140° C. for 30 seconds.

The density of dyes formed was measured using a MacBeth densitometer (using blue filter type for yellow dyes). Visual evaluation of sample quality was also used.

Imaged samples of selected leuco compounds were exposed to ultraviolet radiation for 4 hours. The light source utilised was a General Electric Daylight Fluorescent Tube of 1200 ft-candles ($1.29\times10^{4lx}$). Environmental conditions were 60% Relative Humidity. Measurements of the maximum and minimum densities were then taken.

These results tend to suggest that the oxidation potentials of leuco form of the benzylidene dyes is pH sensitive and accordingly the coating formulations may be adjusted to alter the reactivity of particular compounds.

This effect is clearly illustrated by the different results obtained employing the leuco form of Compound No. 1 in dry silver element having the organic topcoat system described above with the separate addition of phthalic acid, phthalazine and phthalazinone (the latter two compounds are toner/activator compounds which have been employed in known dry silver systems). After exposure and development of the samples the following results were observed.

| Formulation | Image | Comments |
|---|---|---|
| phthalic acid | no image | very stable |
| phthalazine | fogged | very reactive |
| phthalazinone | good differential | good image |
| none | image formed | |

A series of leuco forms of dyes of formula (I) were incorporated in dry silver materials as described above. The visual assessment of the materials after exposure and development as above are reported in the following Table.

| Leuco form of Compound No. | Aqueous (A) Organic (O) topcoat | Image colour |
|---|---|---|
| 1 | O | green/yellow |
| 1 | A | yellow/orange |
| 2 | O | green/yellow |
| 2 | A | yellow/orange |
| 3 | O | green/yellow |
| 3 | A | yellow orange |
| 4 | O | grey, coloured at higher temp. |
| 4 | A | yellow/orange visible grey |
| 5 | O | grey, coloured at higher temp. |
| 5 | A | yellow/orange, grey visible |
| 6 | A | yellow/orange |
| 7 | O | green/yellow |
| 7 | A | yellow/orange high D min |
| 8 | O | slight development |
| 11 | A | yellow/orange |
| 53 | O | poor development, grey |
| 56 | O | poor development, grey |
| 57 | O | poor development, grey |
| 92 | O | yellow |
| 93 | O | brown image, yellow background |

-continued

| Leuco form of Compound No. | Aqueous (A) Organic (O) topcoat | Image colour |
|---|---|---|
| 95 | O | yellow/brown |
| 97* | O | yellow/brown, low density good Dmin |
| 97* | A | orange/brown, low density good Dmin |

(*)Compound No. 97 is a u.v. absorber; the only visible image is the silver image as the dye does not absorb in the visible region.

The formation of a grey or poor quality image reported in the above Table does not negate the use of a particular leuco compound. The colours formed are formulation dependent.

Post Image Stability

Maximum and minimum density measurements were made using a blue filter on a MacBeth Densitometer on certain of the above developed dry silver materials before and after exposure to u.v. light for 4 hours as described above. The results are reported in the following Table.

| | D max | | D min | |
|---|---|---|---|---|
| Compound No. | Before | After | Before | After |
| 1 | 1.29 | 1.29 | 0.20 | 0.25 |
| 2 | 1.84 | 1.84 | 0.18 | 0.23 |
| 3 | 1.96 | 1.96 | 0.23 | 0.28 |
| 4 | 1.30 | 1.30 | 0.15 | 0.27 |
| 5 | 1.89 | 1.89 | 0.19 | 0.27 |
| 11 | 1.20 | 1.20 | 0.18 | 0.20 |
| 92 | 1.17 | 1.17 | 0.28 | 0.35 |

No change in Dmax was observed indicating good dye stability.

Three colour formulation

The two layer coating of the leuco form of Compound No. 2 as described previously with addition of a blue sensitising dye was prepared. The third coating was made by using 127 g of the 10% half soap dispersion to which was added 157 g of toluene. To this was added, with stirring, 3 ml of a 4% solution in methanol of mercuric acetate. 3 ml of a 3.6% mercuric bromide solution in methanol was then added. This was followed by the addition of 6 ml of a 2.36% solution of calcium bromide. 69 g of Butvar B-76 dissolved in 400 g of toluene was then added. To this 30 grams of 20% VAGH (Union Carbide) solution in methyl ethyl ketone was added. 0.2 grams of syringaldazine dissolved in 12 ml of tetrahydrofuran was added to 50 grams of the aforementioned dispersion. 2 ml of a green sensitising dye was also added. This dispersion was then coated at 76 microns wet thickness and dried for 5 minutes at 82° C.

A fourth coating consisting of 20% polystyrene 685D (Dow Chemical Co.) in 50% acetone and 50% toluene with 0.4% phthalazinone was added and coated at 76 microns and dried 5 minutes at 82° C.

The fifth coating was made from a 10% silver behenate dispersion in ethanol. To 54 g of this dispersion was added 190 mg of ethanol. 1.2 ml of mercuric bromide dissolved in methanol was added with stirring. Then 13 g of Butvar B-72 and 5 g of Butvar B-76 was added. A solution of Pergascript Turquoise dissolved 3.4 g in 26 g of toluene was added. 0.001 g of red sensitising dye dissolved in 1.3 ml of methanol was added and dispersion was coated at 76 micron over the fourth coating and dried 5 minutes at 82° C.

The sixth and final coating was composed of the following formula: 46 g of Gantrez ES-225 (GAF Corporation) was mixed with 261 g of methanol and 238 g of ethanol. 14 g of EASB Resin was dissolved in the solution. 20 g of Gantrez S-97 (GAF Corporation) was also dissolved. 5 g of phthalic acid, 0.3 g of 4-nitrophthalic acid and 0.3 g of benzotriazole were dissolved in 12 ml of methanol and added to the solution of resins. This was coated over the fifth coating at 76 micron wet and dried 5 minutes at 82° C.

The resulting tripack was exposed to a colour negative and developed for 20 seconds on a heated blanket. A full 3 colour image was produced giving yellow, magenta and cyan colours of the following maximum densities.

| | D max | D min |
|---|---|---|
| Yellow | 1.42 | 0.21 |
| Magenta | 2.19 | 0.14 |
| Cyan | 1.9 | 0.24 |

The sensitising dyes used were:

Green Sensitising Dye

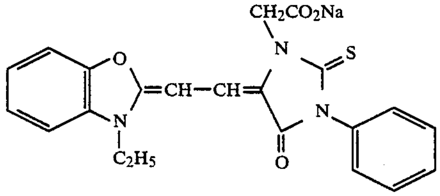

Blue Sensitising Dye

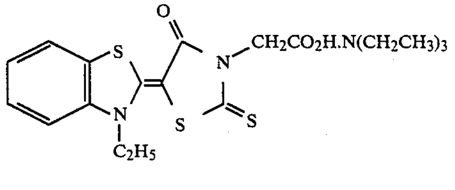

Red Sensitising Dye

-continued

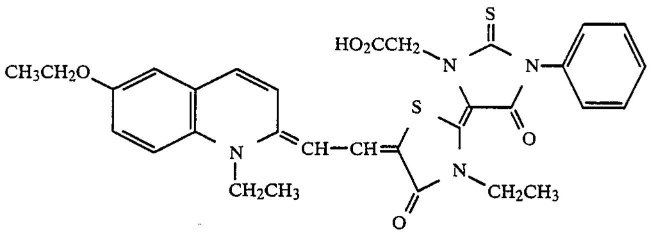

We claim:

1. A photothermographic element comprising a support bearing a photothermographic medium, the medium comprising a light sensitive silver halide in reactive association with a silver salt of an organic acid and a colour generating reducing agent which is a leuco compound which is oxidisable by silver ions into a coloured dye of the general formula:

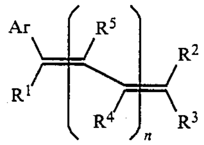

in which:

n=0, 1 or 2, $R^1$ represents H, CN, lower alkyl of 1 to 5 carbon atoms, aryl or $COOR^6$ in which $R^6$ is lower alkyl of 1 to 5 carbon atoms or aryl, $R^2$ and $R^3$ independently represent CN, $NO_2$, $COOR^6$, $SO_2R^6$, or $R^2$ and $R^3$ together represent the necessary atoms to form a 5- or 6-membered carboxylic or heterocyclic ring having ring atoms selected from C, N, O and S atoms, which carbocyclic or heterocyclic rings possess at least one conjugated electron withdrawing substituent, $R^4$ and $R^5$ independently represent H, CN or lower alkyl of 1 to 5 carbon atoms or together represent the necessary atoms to complete a 5- or 6-membered carbocyclic ring, and Ar represents:

(a) a thienyl group which may be substituted with one or more lower alkyl groups of 1 to 5 carbon atoms, (b) a furyl group which may be substituted with one or more lower alkyl groups of 1 to 5 carbon atoms or (c) a phenyl group which may be substituted with one or more groups selected from halogen, hydroxy, lower alkyl of 1 to 5 carbon atoms, lower alkoxy of 1 to 5 carbon atoms, $NR^7R^8$ in which $R^7$ and $R^8$ are independently selected from H, lower alkyl group of 1 to 5 carbon atoms which may possess substituents selected from CN, OH, halogen and phenyl, and phenyl group which may be substituted with substituents selected from OH, halogen, lower alkyl of 1 to 5 carbon atoms or lower alkoxy of 1 to 5 carbon atoms or $R^7$ and $R^8$ together represent the necessary atoms to complete a morpholino group, or when Ar is a phenyl group, that phenyl group may be part of a larger ring structure comprising two or more rings which may be aromatic or heterocyclic containing up to 20 ring atoms selected from C, N, O and S.

2. A photothermographic element as claimed in claim 1 in which $R^2$ and $R^3$ represent the necessary atoms to complete a barbituric acid group or a thiobarbituric acid group.

3. A photothermographic element as claimed in claim 2 in which the colour generating compound is of the formula

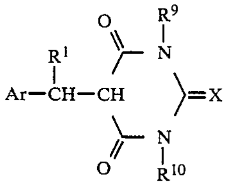

in which:

X is O or S,

Ar and $R^1$ are as defined in claim 1 and $R^9$ and $R^{10}$ independently represent alkyl groups of 1 to 5 carbon atoms, aralkyl groups of up to 10 carbon atoms or a phenyl group.

4. A photothermographic element as claimed in claim 1 in which the colour generating compound upon oxidation by silver ions forms a dye of the formula

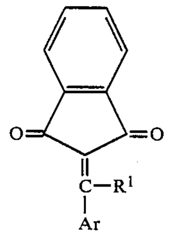

in which:

Ar and $R^1$ are as defined in claim 1.

5. A photothermographic element as claimed in claim 1 in which Ar is

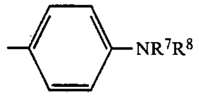

in which:

$R^7$ and $R^8$ are as defined in claim 1.

6. A photothermographic element as claimed in claim 1 in which the silver halide is selected from silver chloride, silver chlorobromide, silver chloroiodide, silver bromide, silver iodobromide, silver chloroiodobromide and silver iodide.

7. A photothermographic element as claimed in claim 1 in which the silver salt of an organic acid is a salt of an aliphatic carboxylic acid or an aromatic carboxylic acid.

8. A photothermographic element as claimed in claim 1 in which the silver salt is silver behenate.

9. A photothermographic element as claimed in claim 1 in which the silver halide is present in the range 0.0005 mol to 5 mol per mole of organic silver salt.

10. A photothermographic element as claimed in claim 1 in which the silver halide is present in the range 0.005 mol to 1.0 mol per mole of organic silver salt.

11. A photothermographic element as claimed in claim 1 in which the colour generating compound is present in an amount in the range 0.1 to 5.0 moles per mole of silver.

12. A photothermographic element comprising a support bearing a photothermographic medium, the medium comprising a light sensitive silver halide in reactive association with a silver salt of an organic acid and a colour generating reducing agent which is a leuco compound which is oxidisable by silver ions into a coloured dye of the general formula:

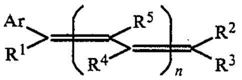

in which:

n=0, 1 or 2, $R^1$ represents H, CN, lower alkyl of 1 to 5 carbon atoms, aryl or $COOR^6$ in which $R^6$ is lower alkyl of 1 to 5 carbon atoms or aryl, $R^2$ and $R^3$ independently represent CN, $NO_2$, $COOR^6$, $SO_2R^6$, $CONHR^6$ in which $R^6$ is as defined above or H, or $R^2$ and $R^3$ together represent the necessary atoms to form a 5- or 6-membered carbocyclic or heterocyclic ring having ring atoms selected from C, N, O and S atoms, which carbocyclic or heterocyclic rings possess at least one conjugated electron withdrawing substituent, $R^4$ and $R^5$ independently represent H, CN or lower alkyl of 1 to 5 carbon atoms or together represent the necessary atoms to complete a 5- or 6-membered carbocyclic ring, and Ar represents:

(a) a thienyl group which may be substituted with one or more lower alkyl groups of 1 to 5 carbon atoms, (b) a furyl group which may be substituted with one or more lower alkyl groups of 1 to 5 carbon atoms or (c) a phenyl group which may be substituted with one or more groups selected from halogen, hydroxy, lower alkyl of 1 to 5 carbon atoms, lower alkoxy of 1 to 5 carbon atoms, $NR^7R^8$ in which $R^7$ and $R^8$ are independently selected from H, lower alkyl group of 1 to 5 carbon atoms which may possess substituents selected from CN, OH, halogen and phenyl, and phenyl group which may be substituted with substituents selected from OH, halogen, lower alkyl of 1 to 5 carbon atoms or lower alkoxy of 1 to 5 carbon atoms or $R^7$ and $R^8$ together represent the necessary atoms to complete a morpholino group, or when Ar is a phenyl group, that phenyl group may be part of a larger ring structure comprising two or more rings which may be aromatic or heterocyclic containing up to 20 ring atoms selected from C, N, O and S.

13. The photothermographic element of claim 2 wherein said barbituric or thiobarbituric acid group is present in said leuco dye and said acid groups bearing substituent groups selected from the class consisting of alkyl group of 1 to 5 carbon atoms, phenyl group, and aralkyl group of up to 10 carbon atoms.

* * * * *